US012712799B2

(12) United States Patent
Mozumdar et al.

(10) Patent No.: US 12,712,799 B2
(45) Date of Patent: Aug. 18, 2026

(54) METHODS, SYSTEMS AND COMPUTER READABLE MEDIA FOR EVALUATING LOAD BALANCING (LB) MECHANISMS USING PACKET IN-FLIGHT TIME

(71) Applicant: Keysight Technologies, Inc., Santa Rosa, CA (US)

(72) Inventors: Suvendu Mozumdar, Kolkata (IN); Kingshuk Mandal, Kolkata (IN)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 31 days.

(21) Appl. No.: 18/410,573

(22) Filed: Jan. 11, 2024

(65) Prior Publication Data

US 2025/0233821 A1 Jul. 17, 2025

(51) Int. Cl.

| | |
|---|---|
| ***H04L 43/50*** | (2022.01) |
| ***H04L 43/067*** | (2022.01) |
| ***H04L 43/106*** | (2022.01) |

(52) U.S. Cl.
CPC ............ *H04L 43/50* (2013.01); *H04L 43/067* (2013.01); *H04L 43/106* (2013.01)

(58) Field of Classification Search
CPC . H04L 43/0864; H04L 43/087; H04L 47/125; H04L 43/50; H04L 43/106; H04L 43/10; H04L 43/067; H04L 43/062; H04L 43/06; H04L 43/04; H04L 43/02; H04L 43/00; H04L 43/16; H04L 47/12; H04L 47/10; H04L 47/00; H04L 47/13; H04L 47/15; H04L 47/17; H04L 47/18; H04L 47/22; H04L 47/23; H04L 47/25; H04L 47/28
See application file for complete search history.

(56) References Cited

U.S. PATENT DOCUMENTS 10,693,951 B2 * 6/2020 Jujjuri ................. H04L 67/1008
11,722,392 B2 8/2023 Zhang et al.
(Continued)

OTHER PUBLICATIONS

Alrammahi, et al., "Performance Analysis for Load Balancing Algorithms using POX Controller in SDN", International Conference on Data Science and Intelligent Computing, pp. 1-6 (2022).
(Continued)

*Primary Examiner* — Rachel J Hackenberg

(57) ABSTRACT

A method for evaluating a load balancing (LB) mechanism, the method comprising: at a test system implemented using at least one processor: sending, via one or more paths comprising network nodes, a first set of test packets comprising transmit (TX) timestamps for evaluating a first LB mechanism; receiving, at a packet destination, the first set of test packets; generating receive (RX) timestamps for the first set of test packets at the packet destination; computing, by the packet destination or a packet analyzer, first in-flight metrics for the first set of test packets using the TX and RX timestamps, wherein computing the first in-flight metrics includes grouping the first set of test packets based on packet or flow characteristics and generating an average in-flight metric, a minimum in-flight metric, or a maximum in-flight metric for each of a plurality of groups; and evaluating the first LB mechanism using the in-flight metrics.

18 Claims, 8 Drawing Sheets

500

(56) References Cited

U.S. PATENT DOCUMENTS

2005/0232227 A1 10/2005 Jorgenson et al.
2013/0294236 A1* 11/2013 Beheshti-Zavareh ........................ H04L 43/062 370/235
2013/0343387 A1* 12/2013 Stroud .................... H04L 45/74 370/392
2020/0177638 A1* 6/2020 Salman ................... H04L 43/16
2020/0313999 A1* 10/2020 Lee ..................... H04L 43/0847

OTHER PUBLICATIONS

Singh, et al., "Performance Evaluation of Load Balancing Algorithms Using Cloud Analyst", IEEE, pp. 156-162 (2020).
Alankar, et al., "Experimental Setup for Investigating the Efficient Load Balancing Algorithms on Virtual Cloud", Sensors, pp. 1-26 (2020).

* cited by examiner

200

500

502

504

METHODS, SYSTEMS AND COMPUTER READABLE MEDIA FOR EVALUATING LOAD BALANCING (LB) MECHANISMS USING PACKET IN-FLIGHT TIME

TECHNICAL FIELD

The subject matter described herein relates to evaluating network equipment or related behavior. More particularly, the subject matter described herein relates to methods, systems, and computer readable media for evaluating load balancing (LB) mechanisms using packet in-flight time.

BACKGROUND

Network nodes, such as network switches or packet forwarding devices, may be configured to perform load balancing (LB), e.g., a routing or forwarding technique for sending packets via multiple paths or links to the same destination. Various LB techniques and related protocols exist. For example, a network switch may utilize an LB mechanism based on internet protocol (IP) hashing so that related packets (e.g., traffic with the same destination IP address and/or source IP address) are sent to a particular node or set of nodes via multiple links or paths. While LB mechanisms can improve network utilization and user experience, manufacturers may utilize different LB techniques or implementations thereof. Depending upon the LB implementations' performances, some implementations may be more or less desirable than others in certain situations. As such, network operators may benefit from understanding the impact (e.g., on network environment or user experience) and/or performance of utilized LB mechanisms.

Accordingly, it may be beneficial to evaluate LB mechanisms utilized by various network nodes, network cards, or equipment for insights and/or other reasons (e.g., prior to deployment).

SUMMARY

The subject matter described herein includes methods, systems, and computer readable media for evaluating load balancing (LB) mechanisms using packet in-flight time. An example method for evaluating an LB mechanism using packet in-flight time occurs at a test system implemented using at least one processor and includes: sending, via one or more paths comprising network nodes, a first set of test packets comprising transmit (TX) timestamps for evaluating a first LB mechanism; receiving, at a packet destination, the first set of test packets; generating receive (RX) timestamps for the first set of test packets at the packet destination; computing, by the packet destination or a packet analyzer, first in-flight metrics for the first set of test packets using the TX and RX timestamps, wherein computing the first in-flight metrics includes grouping the first set of test packets based on packet or flow characteristics and generating an average in-flight metric, a minimum in-flight metric, or a maximum in-flight metric for each of a plurality of groups; and evaluating the first LB mechanism using the in-flight metrics.

An example system for evaluating an LB mechanism using packet in-flight time includes at least one processor and a test system implemented using the at least one processor. The test system is configured for: sending, via one or more paths comprising network nodes, a first set of test packets comprising TX timestamps for evaluating a first LB mechanism; receiving, at a packet destination, the first set of test packets; generating RX timestamps for the first set of test packets at the packet destination; computing, by the packet destination or a packet analyzer, first in-flight metrics for the first set of test packets using the TX and RX timestamps, wherein computing the first in-flight metrics includes grouping the first set of test packets based on packet or flow characteristics and generating an average in-flight metric, a minimum in-flight metric, or a maximum in-flight metric for each of a plurality of groups; and evaluating the first LB mechanism using the in-flight metrics.

The subject matter described herein may be implemented in software in combination with hardware and/or firmware. For example, the subject matter described herein may be implemented in software executed by a processor. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application-specific integrated circuits. In addition, a computer readable medium that implements the subject matter described herein may be located on a single device or computing platform or may be distributed across multiple devices or computing platforms.

As used herein, the term "LB mechanism" refers to a routing or packet forwarding technique or implementation for sharing, balancing, splitting, or otherwise dividing traffic (e.g., packets or flows) among two or more links, paths, or devices and may be implemented using hardware, firmware, or software in combination with hardware and/or firmware.

As used herein, the term "transmit (TX) timestamp" may refer to a time when a packet is transmitted from a source device, e.g., a physical device or a virtual device emulated by a test system.

As used herein, the term "receive (RX) timestamp" may refer to a time when a packet is received at a destination device, e.g., a physical device or a virtual device emulated by a test system.

As used herein, the term "node" refers to a physical node (e.g., at least one computing platform including one or more processors and memory) or a virtual node (e.g., a virtual machine (VM) or container running on a computing platform including one or more processors and memory).

As used herein, each of the terms "function", "engine", and "module" refers to hardware, firmware, or software in combination with hardware and/or firmware for implementing features described herein.

BRIEF DESCRIPTION OF THE DRAWINGS

Embodiments of the subject matter described herein will now be explained with reference to the accompanying drawings, wherein like reference numerals represent like parts, of which.

DETAILED DESCRIPTION

Figure 1:
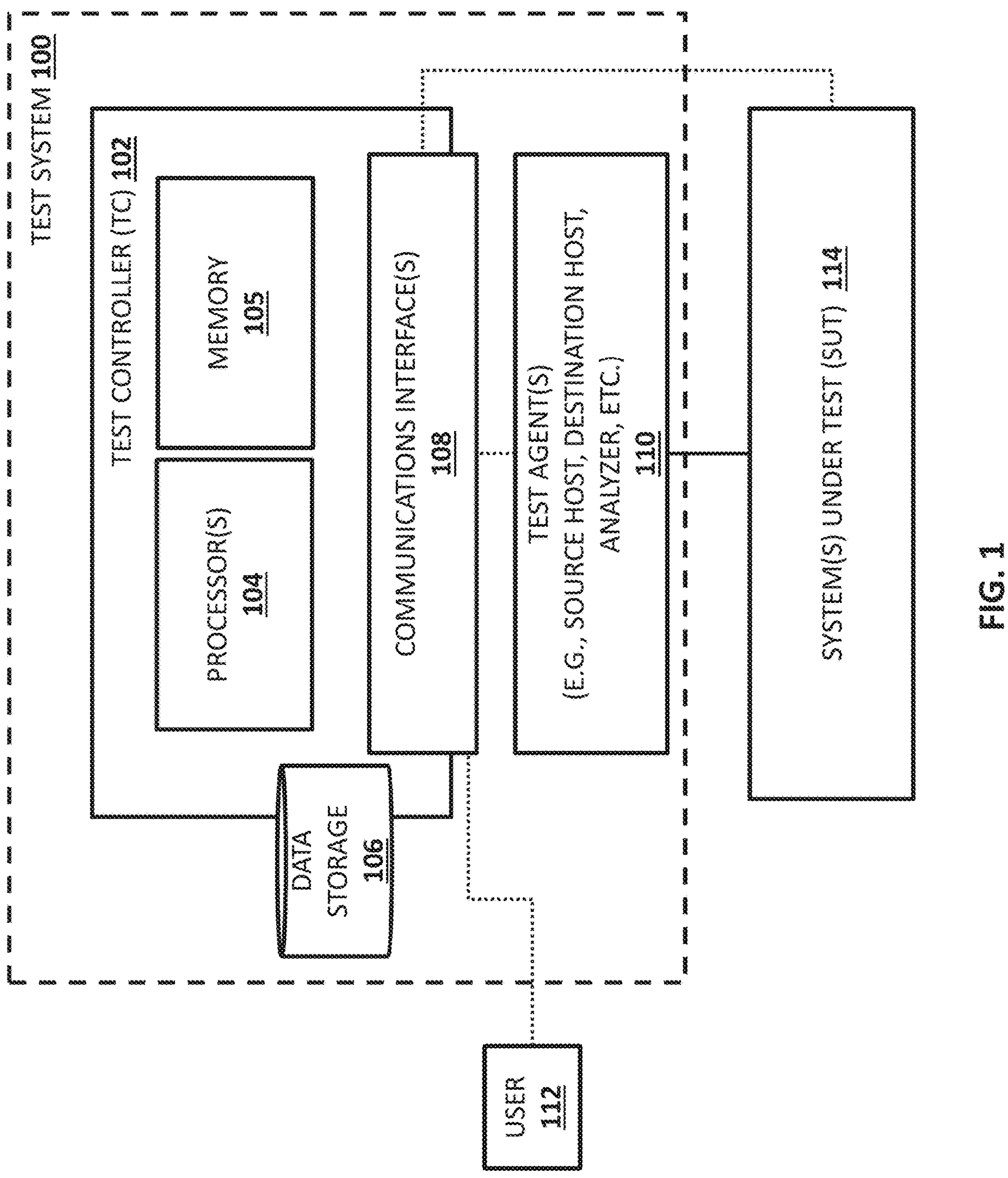
FIG. 1 is a block diagram illustrating an example test system for evaluating load balancing (LB) mechanisms.

The subject matter described herein includes methods, systems, and computer readable media for evaluating load balancing (LB) mechanisms. LB mechanisms may spread traffic across multiple equal cost paths for achieving or attempting to maximum throughput and low latency in networks, e.g., data center networking. Although an ideal LB mechanism may attempt to yield equal throughput or latency among all the equal cost paths, LB mechanisms may fail to achieve this goal because of network dynamics, implementation inefficiencies, and/or other reasons.

LB mechanisms, e.g., an equal-cost multipath (ECMP) routing implementation and a link aggregation group (LAG) routing implementation, may employ similar or different techniques to distribute traffic across multiple physical links or paths. For example, ECMP and LAG implementations may use hash algorithms to divide or split traffic flows among available paths, e.g., by hashing packet header parameter values (e.g., a 5 tuple comprising source address, destination address, source port number, destination port number, and protocol) into hash buckets (e.g., ranges of hash output values) that are associated with unique links or paths. However, in such a scheme, due to hash collision, multiple long-lived flows can get transmitted through the same port of a forwarding device, thereby affecting latency of each flow associated with that port. In this scheme, a flow may be fully bound to a particular transmission port until the end of the flow. To overcome this issue, other LB mechanisms have been utilized (e.g., random packet spray (RPS) or flowlet-based LB implementations) where a particular flow can be sliced into multiple flowlets (e.g., portions of a flow) and distributed across different paths based on the best available resources. However, while some LB mechanisms can be effective in some scenarios, each LB mechanism has their own specific advantages and disadvantages. Hence, it may be beneficial to a network operator or other entity to evaluate LB mechanisms under different scenarios or conditions, e.g., by testing using different types of traffic profiles (e.g., long lived vs. short lived flows) while emulating different types of network conditions, e.g., link failure, congestion, asymmetricity, etc.

In accordance with some aspects of the subject matter described herein, techniques, methods, or mechanisms are disclosed for evaluating LB mechanisms. For example, a test system in accordance with various aspects described herein may be configured for: sending, via one or more paths comprising network nodes, a first set of test packets comprising transmit (TX) timestamps for evaluating a first LB mechanism; receiving, at a packet destination, the first set of test packets; generating receive (RX) timestamps for the first set of test packets at the packet destination; computing, by the packet destination or a packet analyzer, first in-flight metrics for the first set of test packets using the TX and RX timestamps, wherein computing the first in-flight metrics includes grouping the first set of test packets based on packet or flow characteristics and generating an average in-flight metric, a minimum in-flight metric, or a maximum in-flight metric for each of a plurality of groups; and evaluating the first LB mechanism using the in-flight metrics. In this example, the test system may be further configured for: sending, via one or more paths comprising network nodes, a second set of test packets comprising TX timestamps for evaluating a second LB mechanism; receiving, at a packet destination, the second set of test packets; generating RX timestamps for the second set of test packets at the packet destination; computing, by the packet destination or a packet analyzer, second in-flight metrics for the second set of test packets using the TX and RX timestamps, wherein computing the second in-flight metrics includes grouping the second set of test packets based on packet or flow characteristics and generating an average in-flight metric, a minimum in-flight metric, or a maximum in-flight metric for each of a plurality of groups; evaluating the second LB mechanism using the in-flight metrics; analyzing the evaluations of the first LB mechanism and the second LB mechanism; and reporting, to a test operator, analysis information about the evaluations.

Advantageously, a test system in accordance with some aspects of the subject matter described herein may compute in-flight metrics (e.g., an in-flight time for a packet may represent the time elapsed between transmission of the packet from a source and reception of the packet at a destination) and use these metrics in evaluating an LB mechanism. For example, a test system may generate and send test traffic with TX timestamps and receive the test traffic and compute respective RX timestamps for the test traffic. Using the test traffic and related timestamps, the test system may compute various types of metrics usable for evaluating an LB mechanism or aspects thereof. In some embodiments, a test system may compute metrics for different groups or sets of test packets. For example, a test system may group or filter test traffic based on various characteristics of interest (e.g., long duration flows vs short duration flows; a high-bandwidth flow vs a small-bandwidth flow; packet lengths, number of hops, etc.) and then generate different types of in-flight metrics (e.g., average in-flight times, maximum in-flight times, minimum in-flight times, etc.) and/or other metrics for each group. In this example, the test system may use graphs or other visual aids to indicate whether an LB mechanism handles certain types of traffic or flows differently (e.g., notable variations between average in-flight times of different groups). In some embodiments, a test system may perform testing involving multiple LB mechanisms or may compare results to historical data and may use this information in reporting or displaying performance information (e.g., in-flight metrics) about multiple LB mechanisms. As such, a test system in accordance with some aspects of the subject matter described herein may effectively evaluate one or more LB mechanisms using computed in-flight metrics and may provide the evaluation or related analysis in an efficient and effective manner, e.g., using graphs or visual aids.

Reference will now be made in detail to various embodiments of the subject matter described herein, examples of which are illustrated in the accompanying drawings. Wherever possible, the same reference numbers will be used throughout the drawings to refer to the same or like parts.

FIG. 1 is a block diagram illustrating an example test system 100 for evaluating LB mechanisms, e.g., an ECMP or LAG routing implementation, a round robin implementation, a least connections implementation, a weighted round robin implementation, a least response time implementation, an internet protocol (IP) hash implementation, a flow-based LB implementation, a flowlet-based LB implementation, a random packet spray (RPS) implementation, a randomized LB implementation, etc.

Referring to FIG. 1, test system 100 may represent any suitable entity or entities (e.g., one or more testing platforms, nodes, or devices) associated with sending or receiving test traffic (e.g., one or more data units, messages, packets) and/or for testing a SUT 114 (e.g., a network node, a network interface card (NIC), a switching application-specific integrated circuit (ASIC), a network processing unit (NPU), a network switch, a network of switches, etc.) or aspects thereof, e.g., an LB implementation executing on or at SUT 114. For example, test system 100 or related entities may generate and send test traffic to SUT 114, e.g., one or more network switches, smart NICs, remote direct memory access (RDMA) NICs, or a switching ASIC, via one or more physical or virtual links. In this example, test system 100 or related entities may also receive test traffic, copies of test traffic, or test feedback information from SUT 114 via one or more physical or virtual links. Continuing with this example, test system 100 or related entities may use sent and/or received information to analyze performance aspects of SUT 114 or an LB implementation associated with SUT 114.

SUT 114 may include any suitable entity or entities (e.g., devices, cards, chips, systems, platforms, or software executing on one or more processors) for receiving, processing, forwarding, and/or sending one or more messages (e.g., packets). For example, SUT 114 may include a network or portion thereof, e.g., a data center network comprising network nodes or elements, such network switches, routers, load balancers, etc. In another example, SUT 114 or an element thereof may include a network node, a network switch, a network router, a network interface card, a packet forwarding device, or a software based element. In some embodiments, SUT 114 or one or more element(s) thereof may include processing logic (e.g., rules associated with packet forwarding/processing) for LB traffic among a plurality of links or paths.

In some embodiments, SUT 114 may include a container or software in a virtual container (VC) or a virtual machine (VM) executing on shared resources (e.g., compute, storage, and network resources). For example, SUT 114 may be a container or related application acting as a switch or packet forwarding device and may execute on one or more of nodes or physical devices in a cloud or distributed environment.

In some embodiments, test system 100 may be a stand-alone tool, a testing device, a testing platform, or software executing on at least one processor. In some embodiments, test system 100 may be a single node or may be distributed across multiple computing platforms or nodes.

In some embodiments, test system 100 may include one or more modules for performing various functions or operations. For example, test system 100 may include a server and client emulation module for emulating a node or device that communicates with SUT 114.

Test system 100 may include a test controller 102 and one or more test agent(s) 110. Test controller 102 may be any suitable entity or entities (e.g., software executing on a processor, an ASIC, a field programmable gate array (FPGA), or a combination of software, an ASIC, or an FPGA) for performing one or more aspects associated with test session configuration or test management. In some embodiments, test controller 102 may include logic or software executing on processor(s) 104 and may utilize data storage 106.

Test controller 102 may include one or more processor(s) 104 and a memory 105. Processor(s) 104 may represent or include a physical processor, a general purpose microprocessor, a single-core processor, a multi-core processor, a field-programmable gateway array (FPGA), and/or an application-specific integrated circuit (ASIC) for executing software and/or logic stored in memory 105. Memory 105 may represent one or more computer readable media (e.g., random access memory (RAM)) for storing data, logic, or other information.

Data storage 106 may be any suitable entity or entities (e.g., a storage device, a non-transitory computer readable medium, or a storage system) for maintaining or storing information related to testing SUT 114 and/or related metrics. In some embodiments, data storage 106 may include local storage as well as public or private remote repositories, e.g., GitHub. In some embodiments, data storage 106 may contain traffic models, test cases, test session data, test configuration information, configuration information for SUT 114, analytics, LB metrics, test packet data, in-flight metrics, logic for comparing LB implementations, and/or other information. In some embodiments, data storage 106 may be located at or accessible by test system 100, test controller 102, another node, or distributed across multiple platforms or devices.

Communications interface(s) 108 may represent any suitable entities (e.g., network interface cards (NICs), port modules, and/or other hardware or software) for receiving and sending communications via various communications protocols and/or data formats. For example, communications interface(s) 108 may include a user interface (UI), a graphical UI (GUI), and/or an application programming interface (API) for allowing user 112 or another entity to provide configuration information and/or interact with test system 100. In another example, communications interface(s) 108 may include APIs or other interfaces to communicate with SUT 114 and/or test system components, e.g., test agent(s) 110. In this example, communications interface(s) 108 may be usable for providing configuration information (e.g., instructions) for configuring entities, e.g., prior to or during testing.

In some embodiments, test system 100 or a related entity (e.g., test controller 102) may provide a user interface (e.g., communications interface(s) 108) for a user 112 (e.g., a test operator) and/or another entity to interact with test system 100 or provide configuration information or other input. In some embodiments, a user interface associated with test system 100 may support automation (e.g., via one or more scripting languages), a representation state transfer (REST) API, a command line, and/or a web-based GUI. For example, user 112 may be any entity (e.g., an automated system or a device or system controlled or controllable by a human user) for selecting and/or configuring various aspects associated with configuring and/or executing one or more tests or test sessions. In this example, user 112 may utilize a management application user interface (API) and/or a graphical user interface (GUI)) for providing test configuration information, such as a test session plan or definition, test traffic template information, performance metrics to be computed, environment settings, network topology, etc.

Test agent(s) 110 may be any suitable entity or entities (e.g., software executing on a processor, an ASIC, an FPGA, or a combination of software, an ASIC, or an FPGA) for performing one or more aspects associated with testing SUT 114. For example, test agent(s) 110 may be configured for generating and sending test traffic or executing test sessions, test cases, or test scenarios (e.g., a source host or related device); receiving and/or responding to test traffic (e.g., a destination host or related device); and/or analyzing data received in packets and/or stored in memory (e.g., an analyzer or related device). In some embodiments, test agent(s) 110 may be standalone devices or platforms or may be deployed as software executing on other nodes or devices. In some embodiments, test agent(s) 110 may be configurable by test controller 102 or other test system entities. For example, test agent(s) 110 may receive configuration instructions (e.g., test traffic templates and/or related data) from test controller 102 or another source.

In some embodiments, test controller 102 may generate test session plan information (e.g., configuration instructions associated with a test session, test traffic profiles, feedback data to collect or derive, and reports or test performance information to generate) and may provision or provide the configuration instructions to various test system components, e.g., stand-alone or distributed test agent(s) 110. In this example, the configuration instructions may be communicated to various test system components via an external or internal communications channel or protocol.

In some embodiments, test system 100 or test controller 102 may also send instructions for configuring test agent(s) 110 and/or other test system components to provide test feedback information to test system 100 or a related entity. For example, configuration instructions may indicate what statistics, metrics, or metadata to collect about the test traffic, responses to the test traffic, or related routing and when or how to provide this information to test system 100 or a related entity.

In some embodiments, test system 100, test controller 102, or another entity may include functionality for initiating or executing a test session plan. For example, test controller 102 may send configuration information associated with a test session plan to SUT 114 and various other entities (e.g., test agent(s) 110) for testing certain LB mechanisms using various test traffic, traffic patterns, and/or emulated network conditions. In this example, e.g., depending on test goals or objectives, various actions, including for example particular test analysis, may occur.

Example test related actions may include generating and providing test feedback information (e.g., statistics or metrics), copying test traffic or related data and/or sending the copied test traffic or related data to test system 100, or generating and providing traffic distribution data or other test related data (e.g., traffic byte counters, packet counters, drop counters, congestion indicators, latency measurements (e.g., when the platform supports via in-band telemetry or another telemetry technique)).

In some embodiments, test agent(s) 110 may be located at traffic generators, an emulated or non-emulated user device, or another device (e.g., a physical or virtual source host) and may use configuration instructions to generate test traffic associated with a test session or related scenario and to insert transit timestamps into the test traffic before forwarding the test traffic toward a destination. In such embodiments, other test agent(s) 110 may be located at an emulated or non-emulated user device or another device (e.g., a physical or virtual source host) and may use configuration instructions for receiving the test traffic and performing various processing or analysis, e.g., by generating RX timestamps for the test traffic and computing one or more metrics using the timestamps, such as an average in-flight metric, a minimum in-flight metric, or a maximum in-flight metric for the test traffic or subsets thereof.

In some embodiments, test system 100, test controller 102, or another entity (e.g., a test analyzer or a test agent at a destination host) may include functionality for analyzing test feedback information and provide test results or reports. For example, a test analyzer of test system 100 may receive test related data (e.g., test packets, timestamps, and/or in-flight metrics) and derive or compile easy to read or human-comprehensible reports. For example, assuming test system 100 has access to historical data about different LB mechanisms (e.g., implementations utilized by different platforms, different vendors; different hardware or software versions, different releases, etc.), test system 100 or a related entity (e.g., a test analyzer) may compare performance aspects (e.g., in-flight metrics for different packet and/or flow types, LB performance metrics, etc.) about a tested or evaluated LB implementation to a plurality of other LB implementations. In this example, test system 100 or a related entity (e.g., a test analyzer) may generate visuals, images, and/or graphs, e.g., line or bar graphs depicting in-flight metrics for different groups of test traffic flows or packets thereof and/or for different LB implementations.

It will be appreciated that FIG. 1 is for illustrative purposes and that various depicted entities, their locations, and/or their functions described above in relation to FIG. 1 may be changed, altered, added, or removed.

Figure 2:
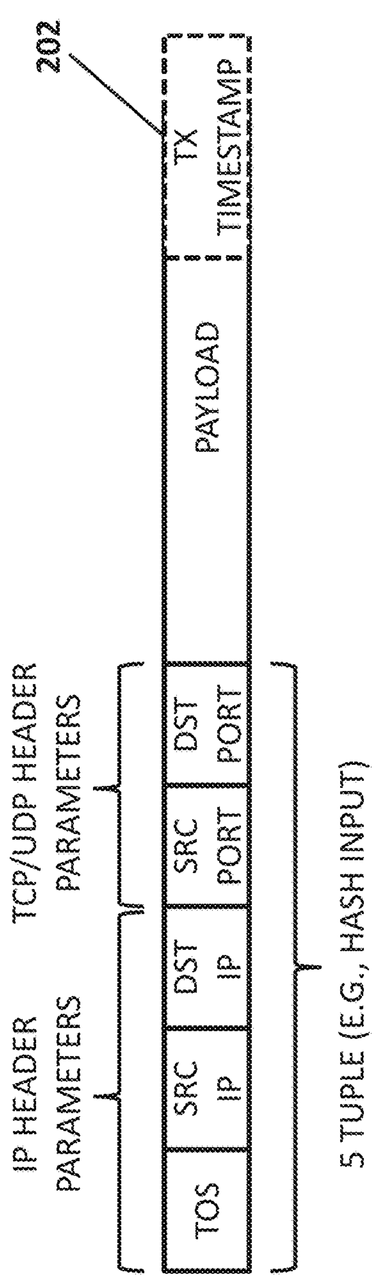
FIG. 2 is a block diagram illustrating an example Internet Protocol (IP) packet comprising some header parameters and a transmit (TX) timestamp.

FIG. 2 is a block diagram illustrating an example IP packet 200 depicting some header parameters and a TX timestamp 202. As depicted in FIG. 2, packet 200 may include various packet header parameters (e.g., header fields) and a payload. Example packet header parameters may include IP header parameters (e.g., a source IP address, a destination IP address, a type of service (TOS) (also referred to herein as a service type)) and transmission control protocol (TCP) or user datagram protocol (UDP) header parameters (e.g., a source port number, and/or a destination port number). In some embodiments, e.g., where header parameter values are used as input by an LB mechanism, a five tuple (e.g., a source IP address, a destination IP address, a service type, a source port number, and a destination port number) may be usable as hash input.

In some embodiments, packet 200 may be encapsulated in an Ethernet frame or packet. In such embodiments, additional header parameters may also be usable by an LB implementation. For example, source and/or destination MAC addresses may be configurable inputs for a link selection algorithm (e.g., a hash function) of an LB implementation.

In some embodiments, TX timestamp 202 may be inserted into packet 200, e.g., by a traffic generator or another entity. For example, a packet generating port of test system 100 (e.g., a test tool or platform) may generate packet 200 and insert the TX timestamp in the IP payload (e.g., at the end of the payload or somewhere else). In this example, the insertion may occur as part of an instrumentation process performed by test system 100.

It will be appreciated that IP packet 200 and portions thereof are for illustrative purposes and not all header parameters or packet configurations are depicted in packet 200. Further, it will be understood that other packets, data units, or traffic may be usable for testing SUT 114 or for evaluating one or more LB mechanisms, e.g., an LB algorithm implementation utilized by data center switches of SUT 114.

Figure 3:
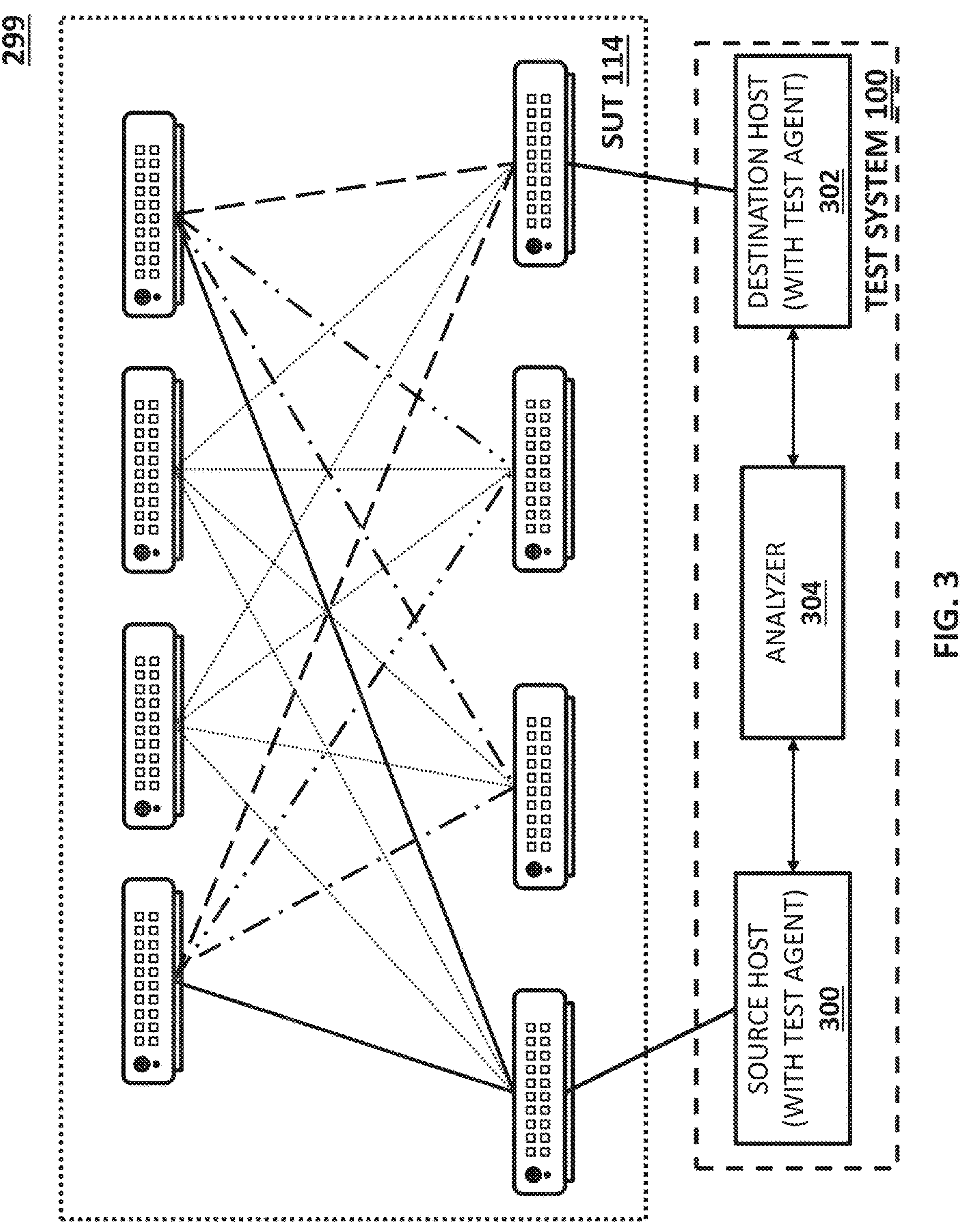
FIG. 3 is a block diagram illustrating an example system under test (SUT) comprising network nodes.

FIG. 3 is a block diagram illustrating an example system under test (SUT) comprising network nodes. In some embodiments, test environment 299 may include test system 100, SUT 114, or other entities (e.g., real or emulated devices, components, or related functionality (e.g., software)) for evaluating an LB mechanism, e.g., an implementation of an LB algorithm or a related routing or forwarding technique. In some embodiments, test system 100 may include a source host 300, a destination host 302, analyzer 304 and/or other test related entities (e.g., test controller 102). For example, test system 100 may be implemented on a single test platform or test system 100 may be distributed across multiple platforms or devices.

In some embodiments, SUT 114 or element(s) thereof may include or utilize one or more LB mechanisms (e.g., a proprietary RPS implementation, a flow-based LB algorithm, a flowlet-based LB algorithm, etc.) for sending packets from a source host 300 via one or more nodes or paths (e.g., equal cost paths) toward destination host 302. For example, LB implementations may be implemented using hardware and/or software executing at or on SUT 114 or element(s) thereof, e.g., a network switch, a router, a switching ASIC, a processor, etc.

Source host 300 may represent any suitable entity (e.g., an emulated or non-emulated node or device, a test port, software executing on a processor, etc.) associated with sending or receiving test traffic (e.g., data units, messages, packets) and/or for testing a SUT 114. In some embodiments, e.g., prior to executing a test session, source host 300 or test agent 110 thereof may be configured (e.g., by test controller 102) for generating test traffic. For example, test controller 102 or a related entity may send instructions to source host 300 or test agent 110 thereof for generating a particular mix of test traffic with various test values or characteristics based on a test plan or user input. In this example, the instructions may also indicate that source host 300 or an entity (e.g., hardware or a timestamping function) may generate and insert TX timestamps (e.g., as or part of a packet signature) into the respective test traffic when transmitted.

Destination host 302 may represent any suitable entity (e.g., an emulated or non-emulated node or device, a test port, software executing on a processor, etc.) associated with sending or receiving test traffic (e.g., data units, messages, packets) and/or for testing a SUT 114. In some embodiments, e.g., prior to executing a test session, destination host 302 or test agent 110 thereof may be configured (e.g., by test controller 102) for handling test traffic and/or generating test results or related metrics. For example, test controller 102 or a related entity may send instructions to destination host 302 or test agent 110 thereof for indicating how test packets are to be processed and/or how metrics are to be computed. In this example, the instructions may also indicate that destination host 302 or an entity (e.g., hardware or a timestamping function) may generate RX timestamps and may store this in a data store and/or insert the generated RX timestamps in the respective test traffic, e.g., concurrently with reception.

Analyzer 304 may represent any suitable entity (e.g., an emulated or non-emulated node or device, software executing on a processor, etc.) associated with analyzing test results (e.g., packets, timestamps, metrics, etc.) and/or generating a report or related information associated with evaluating one or more LB mechanisms. In some embodiments, e.g., prior to executing a test session, source host 300, destination host 302, and/or other entities may be configured (e.g., by test controller 102) to send test results, derived metrics, feedback, or other information to analyzer 304. For example, test controller 102 or a related entity may send instructions to test agents 110 at hosts 300 and 302 for indicating how often and what type of data should be provided to analyzer 304. In this example, test controller 102 or a related entity may also send instructions to analyzer indicating how data should be analyzed and/or how reports or analysis data should be reported or displayed, e.g., instructions may indicate how test packets are to be grouped when generating in-flight metrics or other metrics, how metrics should be computed, and/or how various metrics should be graphed or visually presented to user 112.

In some embodiments, test system 100 or entities thereof (e.g., test controller 102, source host 300, destination host 302, analyzer 304, etc.) may be configured for measuring in-flight times of packets of a particular flow between a source and destination pair (e.g., source host 300 and destination host 302). For example, an in-flight time of a test packet may be measured as the time elapsed between transmission of a packet from its source (e.g., as indicated by a TX timestamp) and reception of the same packet at a destination (e.g., as indicated by an RX timestamp). In this example, assuming a symmetric topology and that all paths are equal cost paths, the in-flight time of all test packets should be substantially the same. However, even assuming an symmetric topology and that all paths are equal cost path, deviations may occur for a particular LB mechanism because of one or more factors, such as the type of flow (e.g., an elephant- or mouse-sized flow), network resources or dynamic changes of the network (e.g., link failure, congestion etc.). For example, as depicted in SUT 114 of FIG. 3, there may be multiple switches in each path. So, in-flight time of a packet will depend on the resource availability and the LB mechanism (e.g., implementation of an LB algorithm) of each of the switches it traverses.

In some embodiments, test system 100 or entities thereof may utilize in-flight times of packets to characterize or evaluate an LB mechanism or aspects thereof, e.g., packet-level and/or flow-level consistency or an efficiency metric. For example, as indicated in FIG. 3, different packets of the same flow (e.g., packets from source host 300 to destination host 302) can take different paths (represented by different line styles) depending on LB implementations utilized by the intermediate switches of SUT 114. Also, it will be appreciated that when packet traverse multiple switches the packets may get differently distributed by each of the switch. Further, since LB mechanisms may be different at each switch and factors that affect LB may change (e.g., resource availability, congestion status, etc.), packets can have different in-flight times.

In some embodiments, test system 100 or entities thereof may utilize in-flight times of packets to compute group related metrics that can be graphed or visually represented and may be usable for evaluating an LB mechanism or a related metric (e.g., an efficiency metric). For example, test packets may be group based on packet size, where each group includes packets of a similar size. In this example, packet size distribution of an LB mechanism may be explored by computing in-flight times for each packet, generating various group metrics (e.g., a minimum in-flight time, a maximum in-flight time, an average in-flight time for each group), and then generating a graphical representation (e.g., a bar graph) using one or more of the group related metrics to indicate how a LB mechanism handles different sized packets and whether its performance is uniform or substantially uniform. In another example, test packets may be group based on flow type or size, where each group includes packets from a particular type of flow. In this example, flow type distribution of an LB mechanism may be explored by computing in-flight times for each packet, generating various group metrics (e.g., a minimum in-flight time, a maximum in-flight time, an average in-flight time for each group), and then generating a graphical representation (e.g., a bar graph) using one or more of the group related metrics to indicate how a LB mechanism handles different types of flows and whether its performance is uniform or substantially uniform.

It will be appreciated that FIG. 3 is for illustrative purposes and that various depicted entities, their locations, and/or their functions described above in relation to FIG. 3 may be changed, altered, added, or removed. For example, in some embodiments, destination host 302 or an entity thereof may include analyzer 304 or provide similar functionality. In another example, in some embodiments, test controller 102 may act as analyzer 304 or provide similar functionality.

Figure 4:
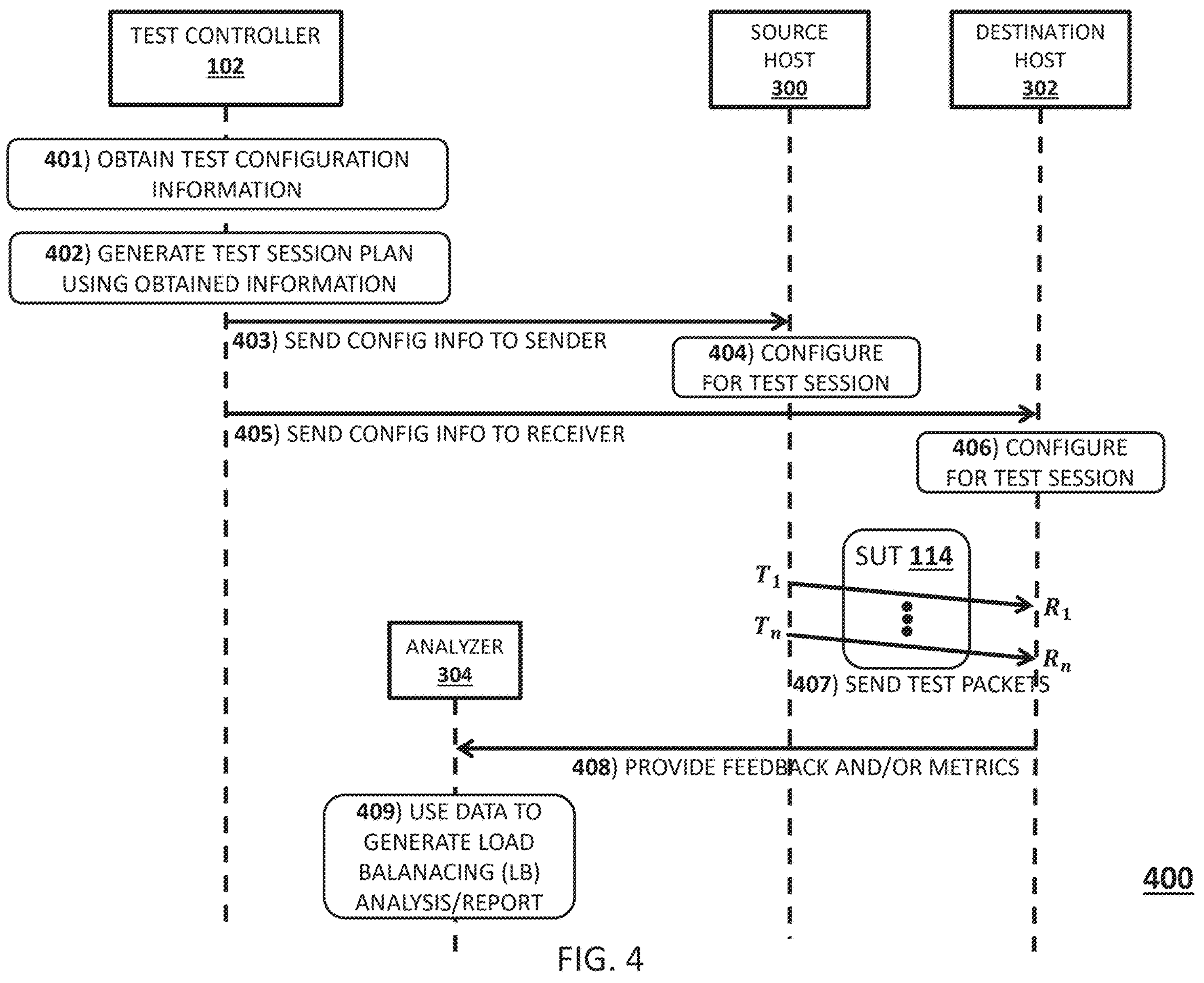
FIG. 4 is a message flow diagram illustrating execution of a test session for evaluating an LB mechanism.

FIG. 4 depicts a message flow diagram 400 illustrating execution of a test session for evaluating an LB mechanism. In some embodiments, test system 100 may include entities depicted in FIGS. 1 and 3 and/or may include at least some functionality described above with regard to one or more entities depicted in FIG. 1 or 3. For example, test system 100 may include test controller 102, source host 300, destination host 302, and an analyzer 304. In this example, test system 100 and entities thereof may be implemented on a single device or platform or may be implemented using multiple devices or platforms.

In some embodiments, a test operator (e.g., user 112) may select or provide configuration information for setting up a test session. For example, user 112 may indicate or provide (e.g., to test controller 102) information about traffic types or flow types to use when evaluating an LB mechanism and may also indicate what types of reports or analysis is to be generated (e.g., graph preferences, group preferences, and/or predefined LB mechanisms to use for comparison purposes).

Referring to FIG. 4, in step 401, test controller 102 or a related entity may obtain test configuration information and other information. For example, test configuration information and/or other information may be provided by user 112 via communications interface(s) 108, e.g., a GUI, an API, or other interface.

In some embodiments, test controller 102 or a related entity may identify or determine test traffic parameters (e.g., packet header fields or payload content) and may be usable for generating varied test traffic when testing an LB mechanism. For example, after determining types of test traffic for identifying packet level consistency or inconsistency in an LB mechanism, test controller 102 or a related entity (e.g., a test session plan generator) may develop test traffic profile(s) designed for evaluating performance aspects of an LB mechanism associated with SUT 114. In this example, a test traffic profile may be useable by source host 300 (e.g., a traffic generator or test agent 110 thereof) to generate pseudo-random test packets or flows with some common or similar attributes.

In step 402, a test session plan may be generated using the obtained information. For example, test controller 102 or a related entity may generate a test session plan for testing an RPS or a flowlet-based LB implementation at SUT 114.

In step 403, at least a first configuration message (e.g., a configuration API call, a REST API message, or other message) comprising configuration information for configuring source host 300 or test agent(s) 110 thereof to execute a test session or portions thereof. For example, test controller 102 or a related entity may send instructions for generating a particular mix of test traffic. In this example, test controller 102 or a related entity may also send instructions indicating when a test session should be executed and/or how source host 300 should generate and insert TX timestamps (e.g., in particular a payload or header portion), compute performance metrics, or provide feedback information associated with testing SUT 114.

In step 404, source host 300 or test agent(s) 110 thereof may configure itself using received configuration information (e.g., provided by test controller 102). In some embodiments, source host 300 or test agent(s) 110 thereof may use configuration information to generate test traffic with various packet or flow characteristics and to generate and insert respective TX timestamps into the test traffic. In some embodiments, e.g., in addition to or lieu of inserting TX timestamps into test packets, TX timestamps may be stored in a data store, e.g., accessible to test system 100 or entities thereof (e.g., destination host 302 or analyzer 304).

In step 405, at least a second configuration message (e.g., a configuration API call, a REST API message, or other message) comprising configuration information for configuring destination host 302 or test agent(s) 110 thereof to receive and process test traffic during a test session. For example, test controller 102 or a related entity may send instructions for causing destination host 302 or test agent(s) 110 thereof (or related hardware and/or software) to generate an RX timestamp for each test packet received and to generate in-flight metrics or other performance metrics. In this example, test controller 102 or a related entity may also send instructions indicating how and when destination host 302 should generate and insert RX timestamps (e.g., in particular a payload or header portion), compute performance metrics, or provide feedback information associated with testing SUT 114.

In step 406, destination host 302 or test agent(s) 110 thereof may configure itself using received configuration information (e.g., provided by test controller 102). In some embodiments, destination host 302 or test agent(s) 110 thereof may use configuration information to receive test traffic to generate and insert respective RX timestamps into the test traffic. In some embodiments, e.g., in addition to or in lieu of inserting RX timestamps into test packets, RX timestamps may be stored in a data store, e.g., accessible to test system 100 or entities thereof (e.g., destination host 302 or analyzer 304).

In some embodiments, a configuration message (e.g., a configuration API call, a REST API message, or other message) comprising configuration information for configuring an LB mechanism at SUT 114 and/or for emulating network conditions may be sent to SUT 114 or element thereof. For example, test controller 102 or a related entity may send instructions to a network switch or test agent thereof in SUT 114 for configuring aspects of a flowlet-based LB implementation at SUT 114 or to emulate latency or other issues for a test session.

In step 407, a test session may be performed or initiated where test packets are sent. For example, test controller 102 or another entity may send a trigger message for starting a test session or test agent(s) 110 may be previously configured to start the test session at predetermined time. In some embodiments, during a test session, TX and RX timestamps may be generated for test packets and made accessible to one or more entities (e.g., destination host 302 and/or analyzer 304) for analysis and/or metric generation.

In step 408, one or more entities (e.g., test agent(s) 110, SUT 114, network taps, etc.) may provide test feedback information. In some embodiments, test agent(s) 110 may be configured to generate metrics or statistics associated with test traffic that traverses SUT 114 and may send this information or related data to test controller 102 or a related entity (e.g., analyzer 304). For example, an in-flight time for each test packet may be computed using related TX and RX timestamps, e.g., in-flight time for packet '1'=$RX_1-TX_1$. In this example, additional metrics or statistics may be computed, e.g., by grouping packets or flows based on certain characteristics (e.g., flow duration, packet size, application protocol, etc.) and then computing group related metrics, e.g., an average in-flight time, a minimum in-flight time, a maximum in-flight time, etc.

In step 409, analyzer 304 or another entity (e.g., destination host 302, test controller 102, etc.) receive and analyze test feedback information and generate a performance report or related information. In some embodiments, analyzer 304 or another entity may obtain test feedback data from various entities and may generate performance reports or test analysis reports using the test feedback data. For example, analyzer 304 may generate a series of graphs representing inflight metrics for one or more packet groups and/or for one or more LB mechanisms. In this example, one graph of in-flight times may indicate packet size distribution of an LB mechanism and may be useful for representing effects of packet size (e.g., jumbo, normal, tiny, etc.) on LB mechanisms, where average in-flight times are depicted for groups based on packet sizes of a same flow or different flow. Continuing with this example, another graph of in-flight times may indicate flow type distribution of an LB mechanism and may be useful for representing effects of flow type (e.g., a large or elephant flow, a medium or lion flow, a small or mouse flow, etc.) on LB mechanisms, where average in-flight times are depicted for groups based on flow types.

It will be appreciated that FIG. 4 is for illustrative purposes and that various depicted messages and details for configuring test agent(s) 110 and for evaluating one or more LB mechanisms described above in relation to FIG. 4 may be changed, altered, added, or removed. It will also be appreciated that various actions described above in relation to FIG. 4 may occur in a different order and/or some of the actions may occur concurrently.

Figure 5A:
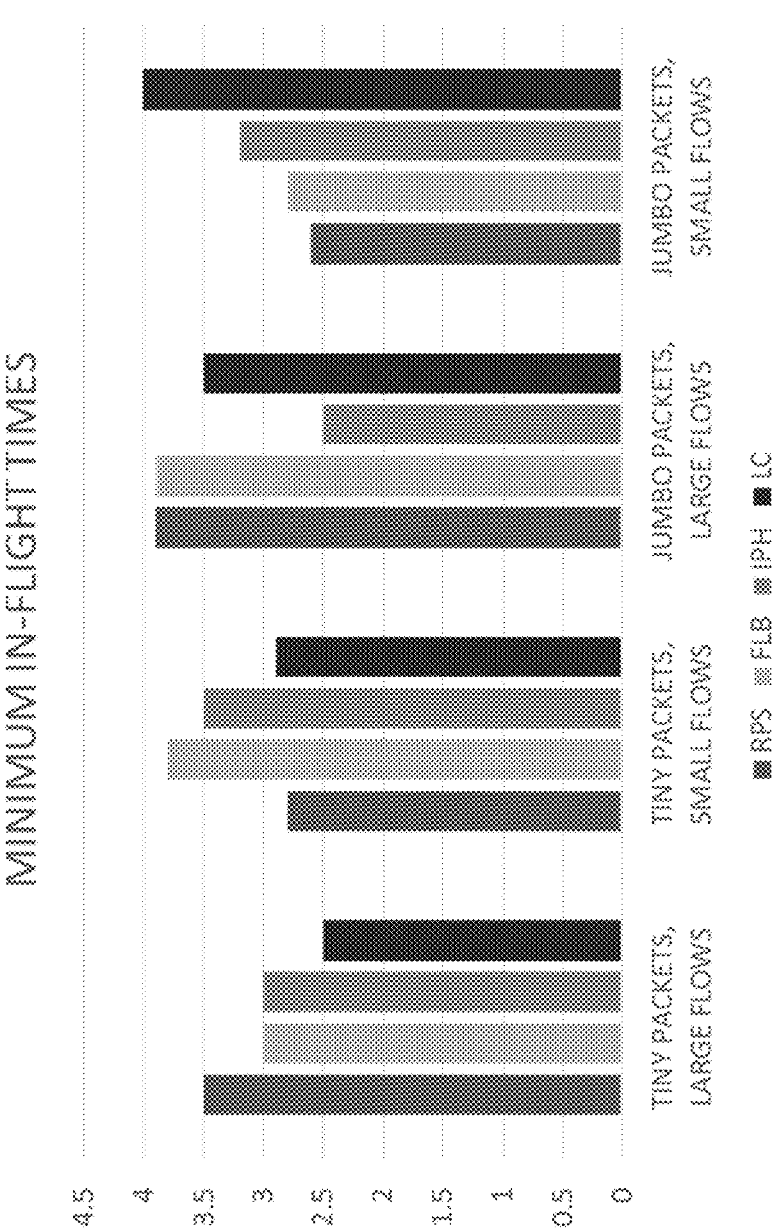
FIGS. 5A-5C depicts bar graphs illustrating in-flight metrics for various LB mechanisms.
Figure 5B:
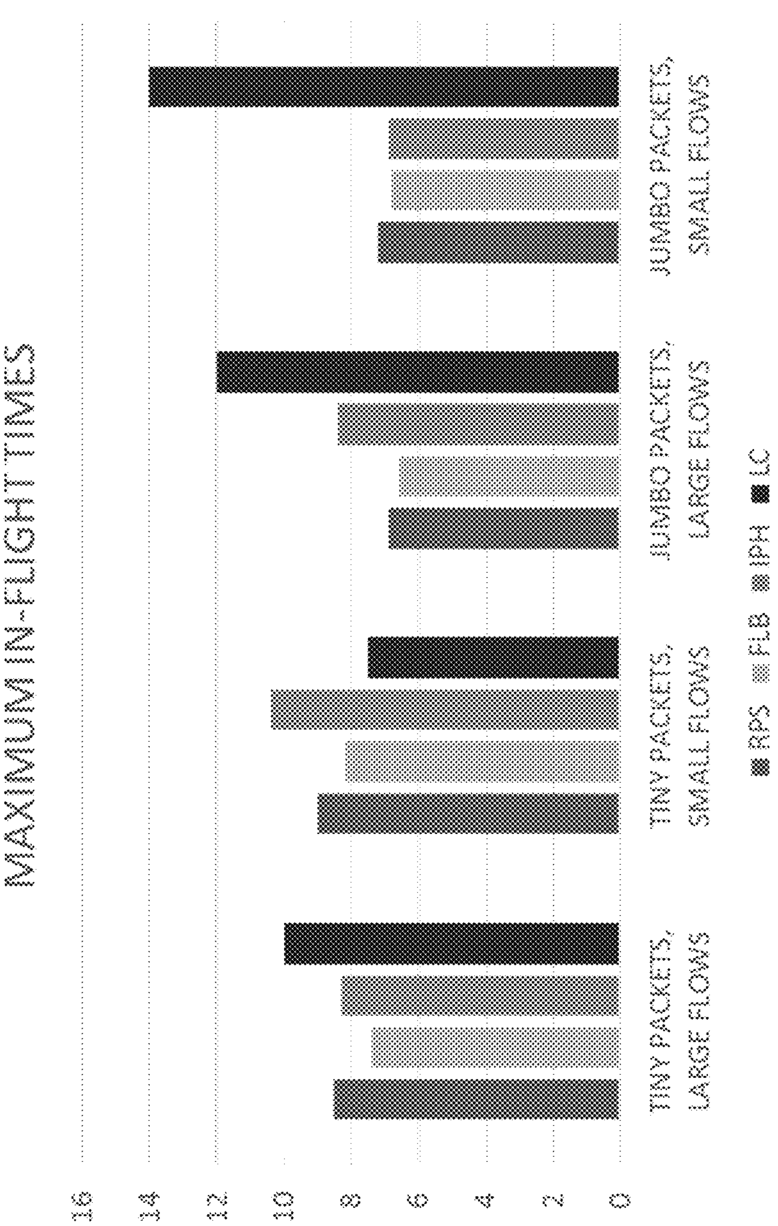
Figure 5C:
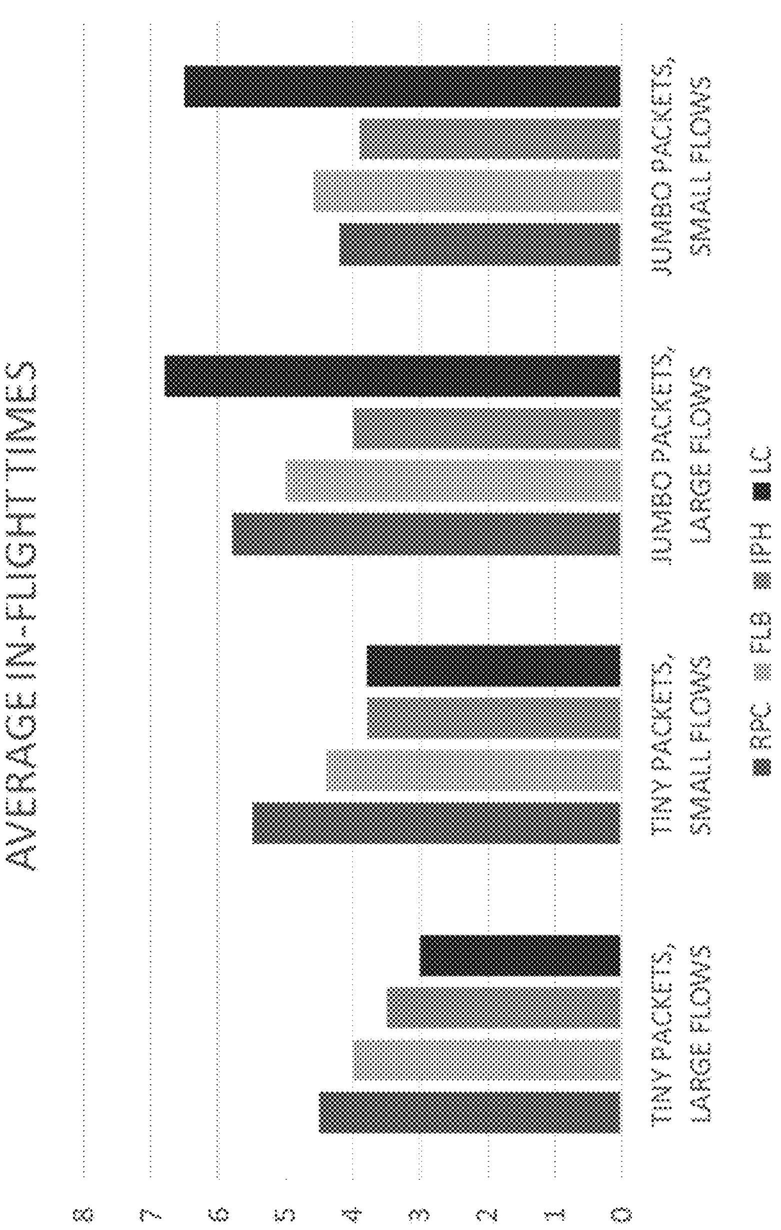

FIGS. 5A-5C depicts bar graphs 500-504 illustrating in-flight metrics for various LB mechanisms. In some embodiments, when evaluating one or more LB mechanisms, it can be beneficial to visual packet-level or flow-level consistency of LB mechanisms by using in-flight times. For example, a test operator (e.g., user 112) may indicate that an LB mechanism (e.g., an RPS LB implementation) being evaluated should be compared to a number of LB mechanisms (e.g., using predefined data, historical data, prior test results, etc.) and may also indicate that particular groupings (e.g., a flow type, a packet size, flow duration, packet protocol, a combination of two or more factors) should be used. In this example, analyzer 304 may generate visual aids (e.g., bar graphs 500-504) depicting in-flight metrics or other metrics for these groups and for each of the LB mechanisms.

Bar graph 500 depicts minimum flight times for a number of different groups and LB mechanisms. Bar graph 502 depicts maximum flight times for a number of different groups and LB mechanisms. Bar graph 504 depicts average flight times for a number of different groups and LB mechanisms.

Each of bar graphs 500-504 include four different groups of bars, where each group represents a packet related grouping. The groups depicted include tiny packets and large flows (e.g., packets that are 100 bytes or less in a flow with 10,000 or more packets), tiny packets and small flows (e.g., packets that are 100 bytes or less in a flow with 1000 or less packets), jumbo packets and large flows (e.g., packets that are 8,000 bytes or more in a flow with 10,000 or more packets), and jumbo packets and small flows (e.g., packets that are 8,000 bytes or more in a flow with 1000 or less packets).

Each group of bars in bar graphs 500-504 depicts metrics associated with four different LB mechanisms, e.g., each LB mechanism is depicted as a unique color. The LB mechanism depicted include an RPS LB implementation (RPS), a flowlet-based LB implementation (FLB), and IP hash based LB implementation (IPH), and a least connections LB implementation (LC).

It will be appreciated that FIG. 5 is for illustrative purposes and that analyzer 304 or another entity may generate other visual aids or graphs for depicting in-flight metrics or other performance metrics related to evaluating one or more LB mechanisms.

Figure 6:
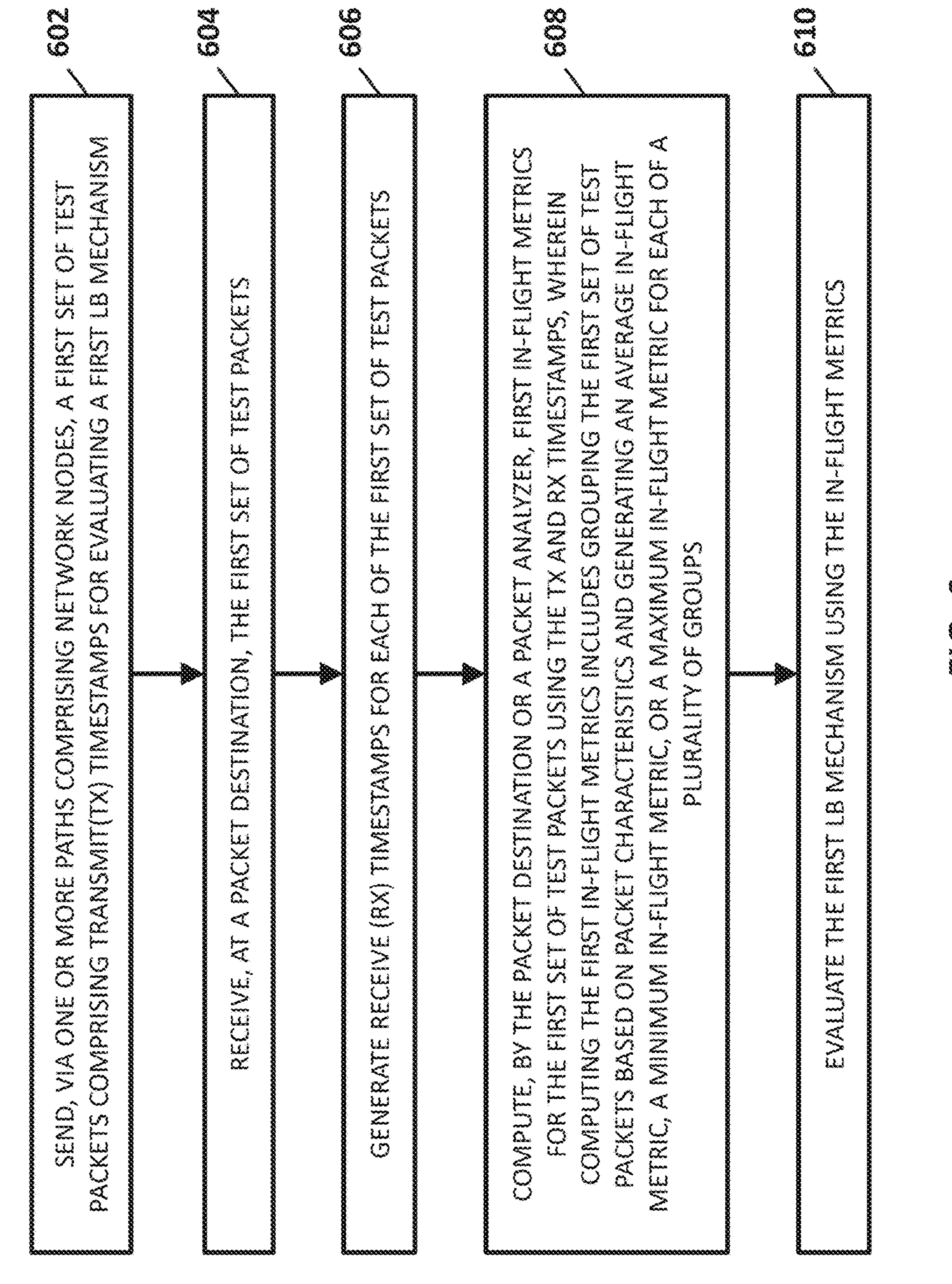
FIG. 6 is a flow chart illustrating an example process for evaluating an LB mechanism.

FIG. 6 is a flow chart illustrating an example process 600 for evaluating an LB mechanism. In some embodiments, process 600, or portions thereof, may be performed by or at test system 100, test controller 102, and/or another node or module. In some embodiments, process 600 may include steps 602, 604, 606, 608, and/or 610.

In some embodiments, process 600 or portions thereof may occur at test system 100. For example, test controller 102 may generate a test session plan and related configuration information (e.g., API calls, configuration messages, instructions, etc.) for configuring test agent(s) 110 and SUT 114. In this example, test controller 102 may also configure test agent(s) 110 for generating appropriate test traffic during the test session and/or generating timestamps and related metrics for use in evaluating LB mechanisms.

Referring to process 600, in step 602, a first set of test packets comprising TX timestamps for evaluating a first LB mechanism may be sent via one or more paths comprising network nodes (e.g., via SUT 114 comprising network switches). For example, source host 300 or another entity may generate and/or insert TX timestamps into the test packets as they are transmitted toward destination host 302 via SUT 114. In this example, generated TX timestamps for test packets may also be stored in a data store (e.g., a centralized data store or a data store accessible to test system entities).

In some embodiments, each generated TX timestamp may be stored in a packet payload of a corresponding test packet.

In step 604, the first set of packets may be received at a packet destination (e.g., destination host 302). For example, destination host 302 may receive test packets originating from source host 300 via SUT 114.

In step 606, RX timestamps may be generated for the first set of test packets. For example, as each test packet arrives at destination host 302, destination host 302 or related hardware or software may generate and store an RX timestamp indicating when the test packet was received. In this example, the generated RX timestamp may be inserted into the received packet and/or stored in a data store (e.g., a centralized data store or a data store accessible to test system entities).

In some embodiments, each generated RX timestamp may be stored in a corresponding test packet or a data store (e.g., in a memory device accessible to test system 100 or entities thereof).

In step 608, first in-flight metrics for the first set of test packets may be computed by the packet destination or a packet analyzer using the TX and RX timestamps. In some embodiments, computing the first in-flight metrics may include grouping the first set of test packets based on packet or flow characteristics (e.g., packet size, flow type, flow duration, protocol, etc.) and generating an average in-flight metric, a minimum in-flight metric, or a maximum in-flight metric for each group.

In some embodiments, grouping a set of test packets may involve using a flow type, a flow duration, a number of packets per flow, a flow rate, a packet size, a virtual local area network (VLAN) ID, a flow identifier, or a data tuple comprising packet parameter values.

In some embodiments, generating a minimum in-flight metric for group of test packets may include computing a packet in-flight time for each packet of the group and selecting the lowest packet in-flight time of the computed packet in-flight times.

In some embodiments, generating a maximum in-flight metric for a group of test packets may include computing a packet in-flight time for each packet of the group and selecting the highest packet in-flight time of the computed packet in-flight times.

In some embodiments, generating an average in-flight metric for a group of test packets may include computing a packet in-flight time for each packet of the group and averaging each of the computed packet in-flight times.

In some embodiments, computing a packet in-flight time for a test packet may include subtracting a first TX timestamp associated with the test packet from a first RX timestamp associated with the test packet.

In step 610, the first LB mechanism may be evaluated using the in-flight metrics. For example, using in-flight times for one or more groups of test packets, analyzer 304 may generate a report indicating whether an LB mechanism exhibits packet level or flow consistency, which may be useful metric in determining whether LB mechanism is suitable for a test operator's use case or scenario.

In some embodiments, evaluating a first LB mechanism may include displaying graphically (e.g., using bar graphs, line graphs, or other visual aids) in-flight metrics for each of a plurality of groups.

In some embodiments, process 600 may include additional steps or actions for evaluating a second LB mechanism and reporting both evaluations to a test operator (e.g., user 112). In such embodiments, process 600 may include sending, via one or more paths comprising network nodes, a second set of test packets comprising TX timestamps for evaluating a second LB mechanism; receiving, at a packet destination, the second set of test packets; generating RX timestamps for the second set of test packets; computing, by the packet destination or a packet analyzer, second in-flight metrics for the second set of test packets using the TX and RX timestamps, wherein computing the second in-flight metrics may include grouping the second set of test packets based on packet or flow characteristics and generating an average in-flight metric, a minimum in-flight metric, or a maximum in-flight metric for each of a plurality of groups; evaluating the second LB mechanism using the in-flight metrics; analyzing the evaluations of the first LB mechanism and the second LB mechanism; and reporting, to a test operator, analysis information about the evaluations.

In some embodiments, a SUT (e.g., SUT 114) may include an ASIC, a NIC, a network switch, a network router, a packet forwarding device, or software emulating one or more devices.

It will be appreciated that process 600 may be for illustrative purposes and that different and/or additional actions may be used. It will also be appreciated that various actions described herein may occur in a different order or sequence. Further, it will be appreciated that process 600 or aspects described herein may be useful for evaluating LB mechanisms.

It should be noted that test system 100, test controller 102, test agent(s) 110, source host 300, destination host 302, analyzer 304, and/or functionality described herein may constitute a special purpose computing device. Further, test system 100, test controller 102, test agent(s) 110, and/or functionality described herein can improve the technological field of evaluating LB mechanisms, e.g., an IP hash based LB implementation, an RPS LB implementation, a flowlet-based LB implementation, etc. Furthermore, test system 100, test controller 102, test agent(s) 110, and/or functionality described herein can improve testing and evaluations involving LB mechanisms (e.g., utilized by SUT 114 or element(s) thereof) by computing and utilizing in-flight metrics for test traffic or groups thereof. For example, by utilizing TX and RX timestamps associated with test traffic, a test system can compute in-flight metrics for one or more types of traffic or flow and can provide this information graphically or visually, e.g., using one or more graphs, thereby allowing a test operator (e.g., user 112) to quickly evaluate whether an LB mechanism has packet-level consistency, flow-level consistency, or other characteristics.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for evaluating a load balancing (LB) mechanism, the method comprising:

at a test system implemented using at least one processor:

sending, via one or more paths comprising network nodes, a first set of test packets comprising transmit (TX) timestamps for evaluating a first LB mechanism;

receiving, at a packet destination, the first set of test packets;

generating receive (RX) timestamps for the first set of test packets;

computing, by the packet destination or a packet analyzer, first in-flight metrics for the first set of test packets using the TX and RX timestamps, grouping the first set of test packets based on packet or flow characteristics and generating an average in-flight metric, a minimum in-flight metric, or a maximum in-flight metric for each of a plurality of groups, wherein grouping the first set of test packets based on the packet or flow characteristics includes assigning, to a first group, test packets in the first set of test packets that are part of packet flows of a first flow type and assigning, to a second group, test packets in the first set of test packets that are part of packet flows of a second flow type different from the first flow type and computing the first in-flight metrics includes computing the first in-flight metrics for the first and second flow types, wherein the first flow type includes packet flows of a first number of packets and a first packet size distribution and the second flow type includes packet flows of a second number of packets greater than the first number of packets and a second packet size distribution with packets of different sizes than the first packet size distribution; and evaluating the first LB mechanism using the first in-flight metrics, wherein evaluating the first LB mechanism using the first in-flight metrics includes comparing the first in-flight metrics computed for first flow type with the first in-flight metrics computed for the second flow type, wherein comparing the in-flight metrics for the first flow type with the in-flight metrics for the second flow type includes comparing packet in-flight times for the packet flows with the first number of packets and the first packet size distribution with packet in-flight times for the packet flows with the second number of packets and the second packet size distribution.

2. The method of claim 1 comprising:

at the test system:

sending, via one or more paths comprising network nodes, a second set of test packets comprising TX timestamps for evaluating a second LB mechanism;

receiving, at a packet destination, the second set of test packets;

generating RX timestamps for the second set of test packets;

computing, by the packet destination or a packet analyzer, second in-flight metrics for the second set of test packets using the TX and RX timestamps for the second set of test packets, wherein computing the second in-flight metrics includes grouping the second set of test packets based on packet or flow characteristics and generating an average in-flight metric, a minimum in-flight metric, or a maximum in-flight metric for each of a plurality of groups;

evaluating the second LB mechanism using the second in-flight metrics;

analyzing the evaluations of the first LB mechanism and the second LB mechanism; and reporting, to a test operator, analysis information about the evaluations of the first LB mechanism and the second LB mechanism.

3. The method of claim 1 wherein evaluating the first LB mechanism includes displaying graphically the in-flight metrics for each of the plurality of groups.

4. The method of claim 1 wherein computing the first in-flight metrics includes generating the minimum in-flight metric for the first group by computing the packet in-flight times for the test packets of the first group and selecting a lowest packet in-flight time of the packet in-flight times computed for the test packets of the first group.

5. The method of claim 1 wherein computing the first in-flight metrics includes generating the maximum in-flight metric for the first group by computing the packet in-flight times for the test packets of the first group and selecting a highest packet in-flight time of the packet in-flight times computed for the test packets of the first group.

6. The method of claim 1 wherein computing the first in-flight metrics includes generating the average in-flight metric for the first group by computing the packet in-flight times for the test packets of the first group and averaging the packet in-flight times computed for the test packets of the first group.

7. The method of claim 6 wherein computing the packet in-flight times for the test packets of the first group includes subtracting a first TX timestamp associated with a first test packet of the test packets of the first group from a first RX timestamp associated with the first test packet.

8. The method of claim 7 wherein the first TX timestamp is stored in a packet payload or a packet header of the first test packet and the first RX timestamp is stored in the first test packet or a data store.

9. A system for evaluating a load balancing (LB) mechanism, the system comprising:

at least one processor;

a memory; and a test system implemented using the at least one processor and the memory, the test system configured for:

sending, via one or more paths comprising network nodes, a first set of test packets comprising transmit (TX) timestamps for evaluating a first LB mechanism;

receiving, at a packet destination, the first set of test packets;

generating receive (RX) timestamps for the first set of test packets;

computing, by the packet destination or a packet analyzer, first in-flight metrics for the first set of test packets using the TX and RX timestamps, grouping the first set of test packets based on packet or flow characteristics and generating an average in-flight metric, a minimum in-flight metric, or a maximum in-flight metric for each of a plurality of groups, wherein grouping the first set of test packets based on the packet or flow characteristics includes assigning, to a first group, test packets in the first set of test packets that are part of packet flows of a first flow type and assigning, to a second group, test packets in the first set of test packets that are part of packet flows of a second flow type different from the first flow type and computing the first in-flight metrics includes computing the first in-flight metrics for the first and second flow types, wherein the first flow type includes packet flows of a first number of packets and a first packet size distribution and the second flow type includes packet flows of a second number of packets greater than the first number of packets and a second packet size distribution with packets of different sizes than the first packet size distribution; and evaluating the first LB mechanism using the first in-flight metrics, wherein evaluating the first LB mechanism using the first in-flight metrics includes comparing the first in-flight metrics computed for first flow type with the first in-flight metrics computed for the second flow type, wherein comparing the in-flight metrics for the first flow type with the in-flight metrics for the second flow type includes comparing in-flight times for the packet flows with the first number of packets and the first packet size distribution with in-flight times for the packet flows with the second number of packets and the second packet size distribution.

10. The system of claim 9 wherein the test system is configured for:

sending, via one or more paths comprising network nodes, a second set of test packets comprising TX timestamps for evaluating a second LB mechanism;

receiving, at a packet destination, the second set of test packets;

generating RX timestamps for the second set of test packets;

computing, by the packet destination or a packet analyzer, second in-flight metrics for the second set of test packets using the TX and RX timestamps for the second set of test packets, wherein computing the second in-flight metrics includes grouping the second set of test packets based on packet or flow characteristics and generating an average in-flight metric, a minimum in-flight metric, or a maximum in-flight metric for each of a plurality of groups;

evaluating the second LB mechanism using the second in-flight metrics;

analyzing the evaluations of the first LB mechanism and the second LB mechanism; and reporting, to a test operator, analysis information about the evaluations of the first LB mechanism and the second LB mechanism.

11. The system of claim 9 wherein evaluating the LB mechanism includes displaying graphically the first in-flight metrics for each of the plurality of groups.

12. The system of claim 9 wherein computing the first in-flight metrics includes generating the minimum in-flight metric for the first group by computing the packet in-flight times for the test packets of the first group and selecting a lowest packet in-flight time of the packet in-flight times computed for the test packets of the first group.

13. The system of claim 9 wherein computing the first in-flight metrics includes generating the maximum in-flight metric for the first group by computing the packet in-flight times for the test packets of the first group and selecting a highest packet in-flight time of the packet in-flight times computed for the test packets of the first group.

14. The system of claim 9 wherein computing the first in-flight metrics includes generating the average in-flight metric for the first group by computing the packet in-flight times for the test packets of the first group and averaging the packet in-flight times computed for the test packets of the first group.

15. The system of claim 14 wherein computing the packet in-flight time for the test packets of the first group includes subtracting a first TX timestamp associated with a first test packet of the test packets of the first group from a first RX timestamp associated with the first test packet.

16. The system of claim 15 wherein the first TX timestamp is stored in a packet payload or a packet header of the first test packet and the first RX timestamp is stored in the first test packet or a data store.

17. The system of claim 9 wherein the first LB mechanism includes an implementation of a round robin algorithm, a least connections algorithm, a weighted round robin algorithm, a least response time algorithm, an internet protocol (IP) hash algorithm, a flow-based LB algorithm, a flowlet-based LB algorithm, a random packet spray (RPS) algorithm, or a randomized LB algorithm.

18. A non-transitory computer readable medium having stored thereon executable instructions embodied in the non-transitory computer readable medium that when executed by at least one processor of a test system cause the test system to perform steps comprising:

sending, via one or more paths comprising network nodes, a first set of test packets comprising transmit (TX) timestamps for evaluating a first load balancing (LB) mechanism;

receiving, at a packet destination, the first set of test packets;

generating receive (RX) timestamps for the first set of test packets;

computing, by the packet destination or a packet analyzer, in-flight metrics for the first set of test packets using the TX and RX timestamps, grouping the first set of test packets based on packet or flow characteristics and generating an average in-flight metric, a minimum in-flight metric, or a maximum in-flight metric for each of a plurality of groups, wherein grouping the first set of test packets based on the packet or flow characteristics includes assigning, to a first group, test packets in the first set of test packets that are part of packet flows of a first flow type and assigning, to a second group, test packets in the first set of test packets that are part of packet flows of a second flow type different from the first flow type and computing the in-flight metrics includes computing the in-flight metrics for the first and second flow types, wherein the first flow type includes packet flows of a first number of packets and a first packet size distribution and the second flow type includes packet flows of a second number of packets greater than the first number of packets and a second packet size distribution with packets of different sizes than the first packet size distribution; and evaluating the first LB mechanism using the in-flight metrics, wherein evaluating the first LB mechanism using the in-flight metrics includes comparing the in-flight metrics computed for first flow type with the in-flight metrics computed for the second flow type, wherein comparing the in-flight metrics for the first flow type with the in-flight metrics for the second flow type includes comparing in-flight times for the packet flows with the first number of packets and the first packet size distribution with in-flight times for the packet flows with the second number of packets and the second packet size distribution.

* * * * *